(12) United States Patent  
Blomqvist

(10) Patent No.: US 8,997,565 B2
(45) Date of Patent: Apr. 7, 2015

(54) MICRO-MECHANICAL SENSOR OF ANGULAR VELOCITY

(75) Inventor: Anssi Blomqvist, Helsinki (FI)

(73) Assignee: Murata Electronics Oy, Vantaa (FI)

( * ) Notice: Subject to any disclaimer, the term of this patent is extended or adjusted under 35 U.S.C. 154(b) by 366 days.

(21) Appl. No.: 12/715,803

(22) Filed: Mar. 2, 2010

(65) Prior Publication Data

US 2010/0222998 A1 Sep. 2, 2010

(30) Foreign Application Priority Data

Mar. 2, 2009 (FI) .................................. 20095201
Sep. 2, 2009 (FI) .................................. 20095903

(51) Int. Cl.
*G01C 19/56* (2012.01)
*G01C 21/00* (2006.01)
*G01C 19/5747* (2012.01)

(52) U.S. Cl.
CPC .................................. *G01C 19/5747* (2013.01)

(58) Field of Classification Search
CPC .................................................. G01C 19/5747
USPC ................ 73/504.02–504.04, 504.12, 504.14
See application file for complete search history.

(56) References Cited

U.S. PATENT DOCUMENTS

| | | | |
|---|---|---|---|
| 5,635,638 A | 6/1997 | Geen | |
| 5,728,936 A | 3/1998 | Lutz | |
| 5,920,012 A | 7/1999 | Pinson | |
| 6,067,858 A | 5/2000 | Clark et al. | |
| 6,122,961 A | 9/2000 | Geen et al. | |
| 6,250,156 B1 | 6/2001 | Seshia et al. | |
| 6,467,348 B1 | 10/2002 | Song et al. | |
| 6,520,015 B1* | 2/2003 | Alause et al. ................... | 73/497 |
| 6,742,390 B2 | 6/2004 | Mochida et al. | |
| 6,752,017 B2 | 6/2004 | Willig et al. | |
| 6,807,858 B2 | 10/2004 | Orsier | |
| 6,843,127 B1 | 1/2005 | Chiou | |
| 6,860,151 B2 | 3/2005 | Platt et al. | |
| 6,892,575 B2 | 5/2005 | Nasiri et al. | |
| 7,036,372 B2 | 5/2006 | Chojnacki et al. | |
| 7,043,985 B2 | 5/2006 | Ayazi et al. | |

(Continued)

FOREIGN PATENT DOCUMENTS

| | | |
|---|---|---|
| JP | 09-119942 A | 6/1997 |
| JP | 2000-131071 A | 5/2000 |

(Continued)

OTHER PUBLICATIONS

International Search Report international application No. PCT/FI2010/050159 dated Jun. 1, 2010.

(Continued)

*Primary Examiner* — Helal A Algahaim
*Assistant Examiner* — Charles J Han
(74) *Attorney, Agent, or Firm* — Squire Patton Boggs (US) LLP

(57) ABSTRACT

A micro-mechanical resonator is provided. The micro-mechanical resonator comprises two masses coupled in the direction of a common axis by a spring structure. The spring structure comprises a spring that couples at least a first bar connected to the masses and a second bar extending in the motion axis direction, said spring being arranged to bend in a direction perpendicular to the motion direction of the motion axis. A micro-mechanical resonator matrix, a sensor and a navigation device are also provided.

11 Claims, 6 Drawing Sheets

(56) References Cited

U.S. PATENT DOCUMENTS

| | | |
|---|---|---|
| 7,191,653 B2 | 3/2007 | Park et al. |
| 7,210,347 B2 | 5/2007 | Nicu et al. |
| 7,267,004 B2 | 9/2007 | Leverrier et al. |
| 7,316,161 B2 | 1/2008 | Willig et al. |
| 7,340,954 B2 | 3/2008 | Handrich |
| 7,347,094 B2 | 3/2008 | Geen et al. |
| 7,617,728 B2 | 11/2009 | Cardelli |
| 7,631,558 B2 | 12/2009 | Diem |
| 7,707,886 B2 | 5/2010 | Rougeot et al. |
| 8,011,244 B2 | 9/2011 | Diem |
| 8,061,201 B2 | 11/2011 | Ayazi et al. |
| 8,104,364 B2 | 1/2012 | Chaumet |
| 8,365,595 B2 | 2/2013 | Geiger et al. |
| 2004/0154397 A1 | 8/2004 | Platt et al. |
| 2004/0154400 A1 | 8/2004 | Johnson et al. |
| 2004/0189198 A1 | 9/2004 | Wang et al. |
| 2004/0250620 A1 | 12/2004 | Nicu et al. |
| 2005/0024527 A1* | 2/2005 | Chiou ............... 348/373 |
| 2006/0010978 A1 | 1/2006 | Lee et al. |
| 2006/0032306 A1 | 2/2006 | Robert |
| 2006/0156814 A1* | 7/2006 | Blomqvist ............ 73/504.12 |
| 2008/0150554 A1 | 6/2008 | Wang et al. |
| 2008/0282833 A1 | 11/2008 | Chaumet |
| 2008/0314144 A1* | 12/2008 | Blomqvist ............ 73/504.12 |
| 2009/0031806 A1* | 2/2009 | Hartmann et al. ..... 73/504.12 |

FOREIGN PATENT DOCUMENTS

| | | |
|---|---|---|
| JP | 2005-535889 A | 11/2005 |
| JP | 2006-515928 A | 6/2006 |
| JP | 2008-516217 A | 5/2008 |
| WO | 2005/017445 A2 | 2/2005 |
| WO | 2006/070059 A1 | 7/2006 |
| WO | 2009/119470 A1 | 10/2009 |

OTHER PUBLICATIONS

Non-Final Office Action; dated Apr. 24, 2012, Issued on Corresponding U.S. Appl. No. 12/715,767.
Final Office Action mailed Aug. 26, 2013, issued in related U.S. Appl. No. 12/715,767.
Office Action dated Jun. 6, 2014, issued in corresponding Taiwan Patent Application No. 099106031.
International Search Report dated Jun. 15, 2010, issued in corresponding International Application No. PCT/FI2010/050160.
Office Action dated May 23, 2014, issued in corresponding Taiwan Patent Application No. 099106035 (5 pages).
Final Office Action dated Nov. 5, 2012, issued in corresponding U.S. Appl. No. 12/715,767.
Non-Final Office Action dated Mar. 21, 2013, issued in corresponding U.S. Appl. No. 12/715,767.
Non-Final Office Action dated Feb. 21, 2014, issued in corresponding U.S. Appl. No. 12/715,767.
Notice of Allowance dated Aug. 19, 2014, issued in corresponding U.S. Appl. No. 12/715,767.

* cited by examiner

Prior Art

MICRO-MECHANICAL SENSOR OF ANGULAR VELOCITY

The invention relates to sensors of angular velocity, particularly to vibrating micro-mechanical sensors of angular velocity.

BACKGROUND

Central features required of sensors of angular velocity are resistance to vibration and impact. Particularly in applications in the automotive industry, for example, such as driving stability control systems, these requirements are extremely tight. Even a violent external blow, e.g. from a stone, or vibration caused by a car stereo, should not interfere with the output of the sensor of angular velocity.

In many micro-mechanical resonators, like e.g. sensors of angular velocity, designing a coupling spring between the moving masses would be preferable, which spring would enable opposite phase motion of the masses and, at the same time, would resist common mode motion of the masses. Such an arrangement is needed particularly for distinguishing various disturbances from the actual signal, such as instances of mechanical impact. Usually, the signal detected from the masses is differential, whereas acceleration influencing them equally causes a common mode displacement.

In FIG. 1, a diagram is shown of a prior art simple coupled resonator, in which the coupling spring J is an identical one-dimensional spring like the other ones. Thus, the simple coupling resonator consists of two masses m1, m2 and three identical one-dimensional springs J. The structure according to FIG. 1 efficiently separates the masses' common mode of motion from the differential mode. However, the structure is unfavorable from the standpoint of acceleration sensitivity, since the masses are more easily displaced in the same phase (the frequency of the mode being lower) than in opposite phase, because the coupling spring will not participate in the motion in the same phase.

In the U.S. patent publication U.S. Pat. No. 6,752,017 B2 particularly depicted are coupled spring structures for a Z-axis gyro, wherein the detection motion is a vibration in opposite phases of masses on a common axis of motion. A common feature of these spring structures is, that they participate in defining both the primary mode and the secondary mode frequencies, and, according to the patent publication, they are positioned between the masses to be coupled, which are located next to each other.

However, the spring structures described in the patent publication have some drawbacks. For example, sensitivity to linear acceleration, because, like the simple coupled resonator described above, they have more slackness for common mode than for opposite phase motion. Thus, blows and vibration displace the masses more easily than does the desired excitation required for the vibration mode in opposite phases. Further, non-linearity in the primary mode is hard to control, because the spring structures participate in both modes. In fact, it would be preferable completely to separate the coupling spring structures for the different modes from each other, such that the non-linearity of the primary mode suspension could be dimensioned independently from the secondary suspension.

A clearly better solution from the viewpoint of mechanical interference, when having vibrating masses with parallel axes, is a seesaw type coupling spring, since it is stiffer for displacement in the same phase than for displacement in opposite phases. Such a coupling suspension is, for example, implemented in the patent application FI 20095201, for which priority is claimed, for primary motion in the y direction of excitation frames, and also presented in FIG. 2, which shows a sensor of angular velocity for the Z axis, in which is shown an example of a seesaw type coupled spring structure in the top and bottom ends in the y axis direction.

However, the angular velocity sensor structure of FIG. 2 completely lacks coupling between the masses inside the frames, whereby, in the x axis direction, the masses operate as nearly independent acceleration sensors. Being uncoupled, they are mechanically almost as sensitive to (common mode) mechanical interference as they are to any opposite phase Coriolis force to be detected. Thus, the question remains open, how preferably to design a coupling suspension for the masses, which would prevent their motion in the same phase, but still would not participate in the primary motion in the y axis direction.

A seesaw suspension similar to the one described above constitutes a working solution with masses moving along, as such, parallel and side by side located axes, but considering a tightly packed structure, takes rather a lot of space. Such a structure provided with masses moving opposite to each other on a common axis, which in a way is even wasteful, is roughly illustrated in FIG. 3. One can clearly see from FIG. 3, that such a structure occupies almost the whole space between the masses, which previously was used for the excitation comb structures of the primary motion.

Thus, the problem remains unsolved, how to implement a structure, at the same time compact and still capable of operating in opposite phase vibrating mode more willingly than in the same phase, and how to then, as a consequence of the opposite phase mode, one could utilize the advantages offered by the opposite phase for e.g. removing interference.

With the technique according to the embodiments of the invention, a solution is obtained to the problem presented above and also to other associated problems; and, if not completely resolved, the effects of the problems will be at least alleviated.

The micro-mechanical resonator according to the invention is characterized in what is mentioned in the characterizing part of the independent claim related to the same.

The sensor according to the invention is characterized in what is mentioned in the characterizing part of the independent claim related to the same.

The vehicle according to the invention is characterized in what is mentioned in the characterizing part of the independent claim related to the same.

The navigator according to the invention is characterized in what is mentioned in the characterizing part of the independent claim related to the same.

The system of micromechanical resonators comprises at least one micromechanical resonator that comprises two masses (M1 M2) that are coupled in direction of their common motion axis with spring structure (401, 402, 403, 404a, 404b, 404c) that comprises at least two beams (402) connected to the masses and spring suspension (404a, 404b, 404c) parallel to the motion axis coupling the beams that deflects perpendicularly to the motion.

In the dependent claims, other preferable embodiments of the invention are presented.

BRIEF DESCRIPTION OF THE DRAWINGS

In the FIGS. 1-3, reference is made to prior art as such (FIG. 1) or to technique presented elsewhere and known to the applicant at the date of filing for processing of the present application (FIG. 2, and FIG. 3, patent document FI 20095201), as follows.

Figure 1:
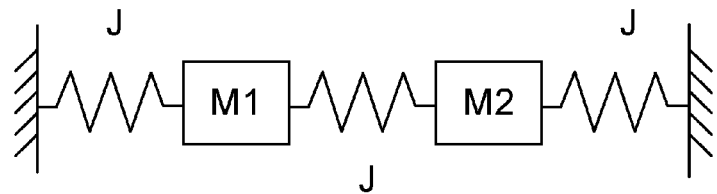
FIG. 1 illustrates a diagram of a simple coupled resonator according to prior art as such.

Since, as mentioned above, the FIGS. 1-3 were referencing technique presented elsewhere, below, examples are presented referring to FIGS. 4-9, for illustrating embodiments of the invention, presented in the present application. Thus, the intention is not to limit the embodiments exclusively to embodiments according to the presented examples, nor within those, exclusively according to the proportions being disclosed in the figures. The embodiments of the invention can be combined with each other, as applicable.

Figure 4:
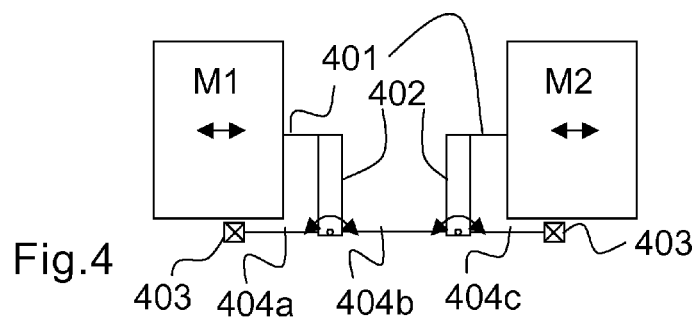
Figure 5:
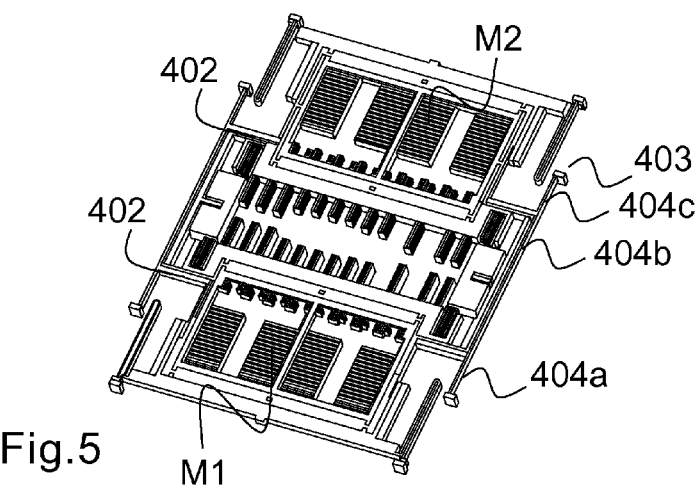
Figure 6:
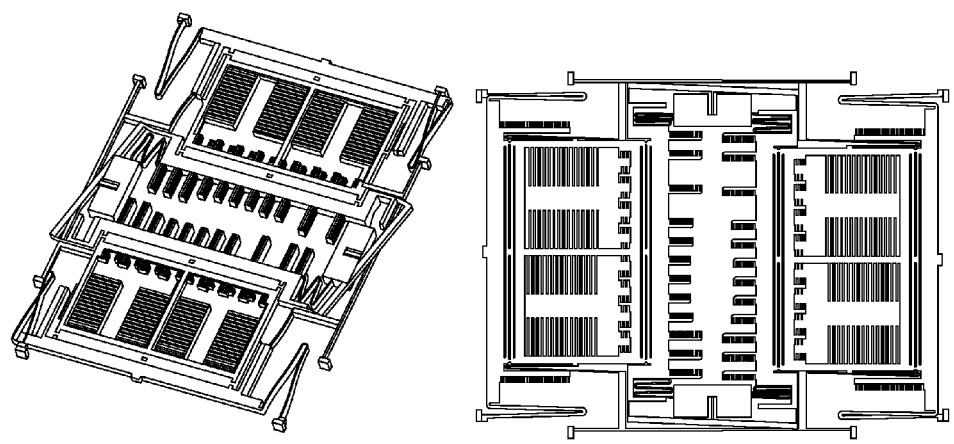
Figure 7:
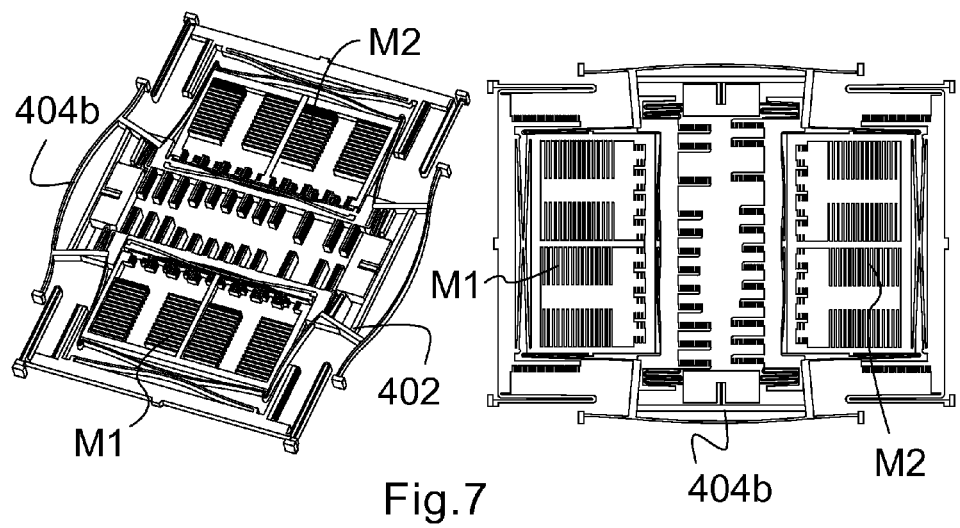
Figure 8:
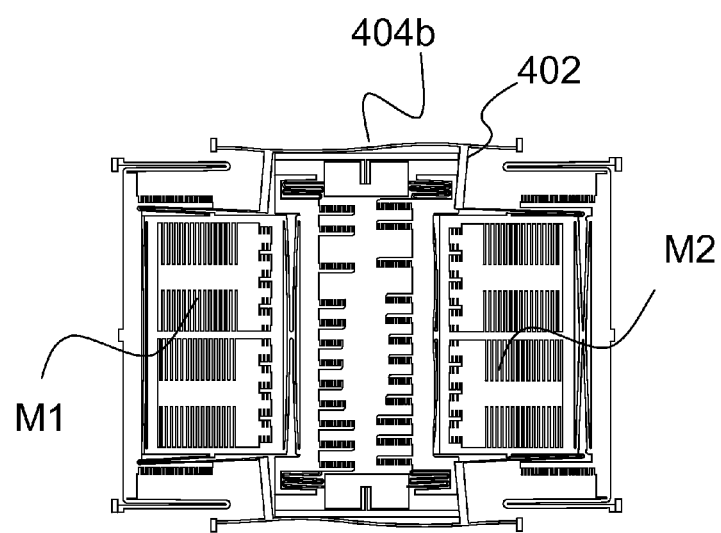

FIG. 4 illustrates a diagram of a spring structure according to an embodiment of the invention, FIG. 5 illustrates a Z axis angular velocity sensor structure according to an embodiment of the invention, FIG. 6 illustrates the primary mode of a Z axis angular velocity sensor structure according to an embodiment of the invention, FIG. 7 illustrates the detection mode of a Z axis angular velocity sensor structure according to an embodiment of the invention, and FIG. 8 illustrates the effect of linear acceleration in the detection direction in a Z axis angular velocity sensor structure according to an embodiment of the invention.

Figure 9:
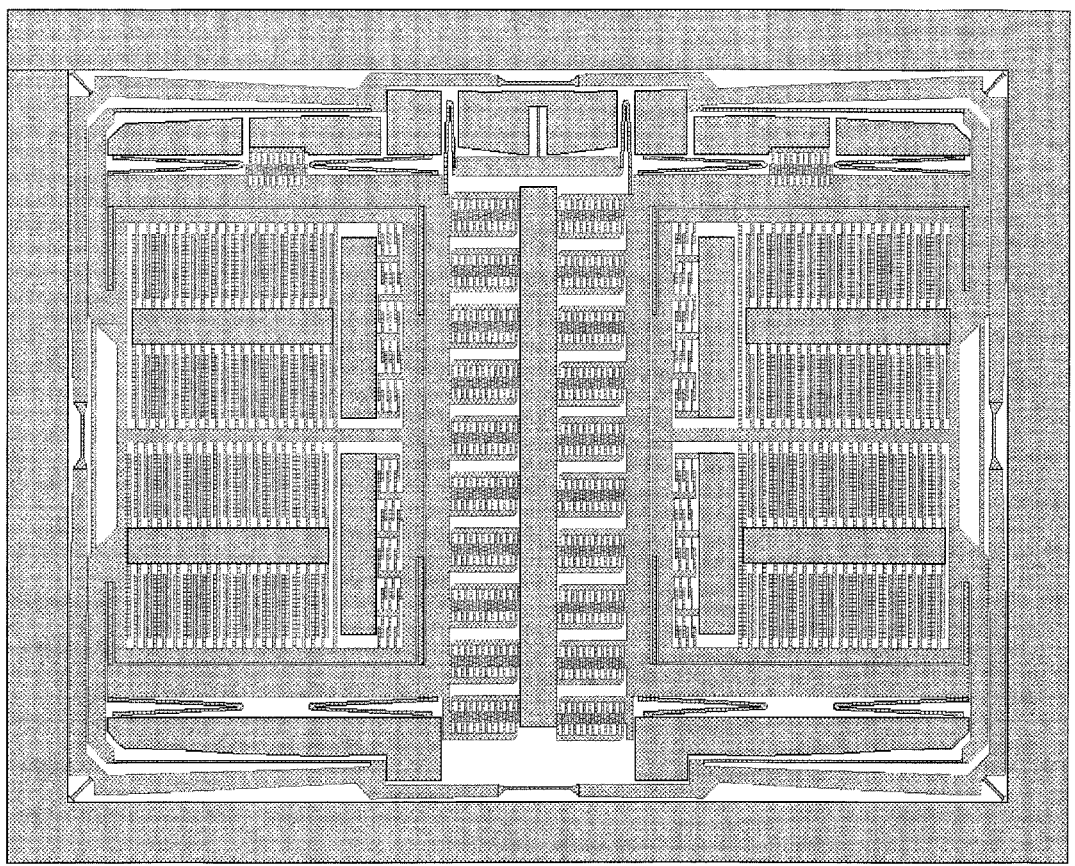

FIG. 9 illustrates an embodiment of the invention, with a secondary coupling.

Figure 10:
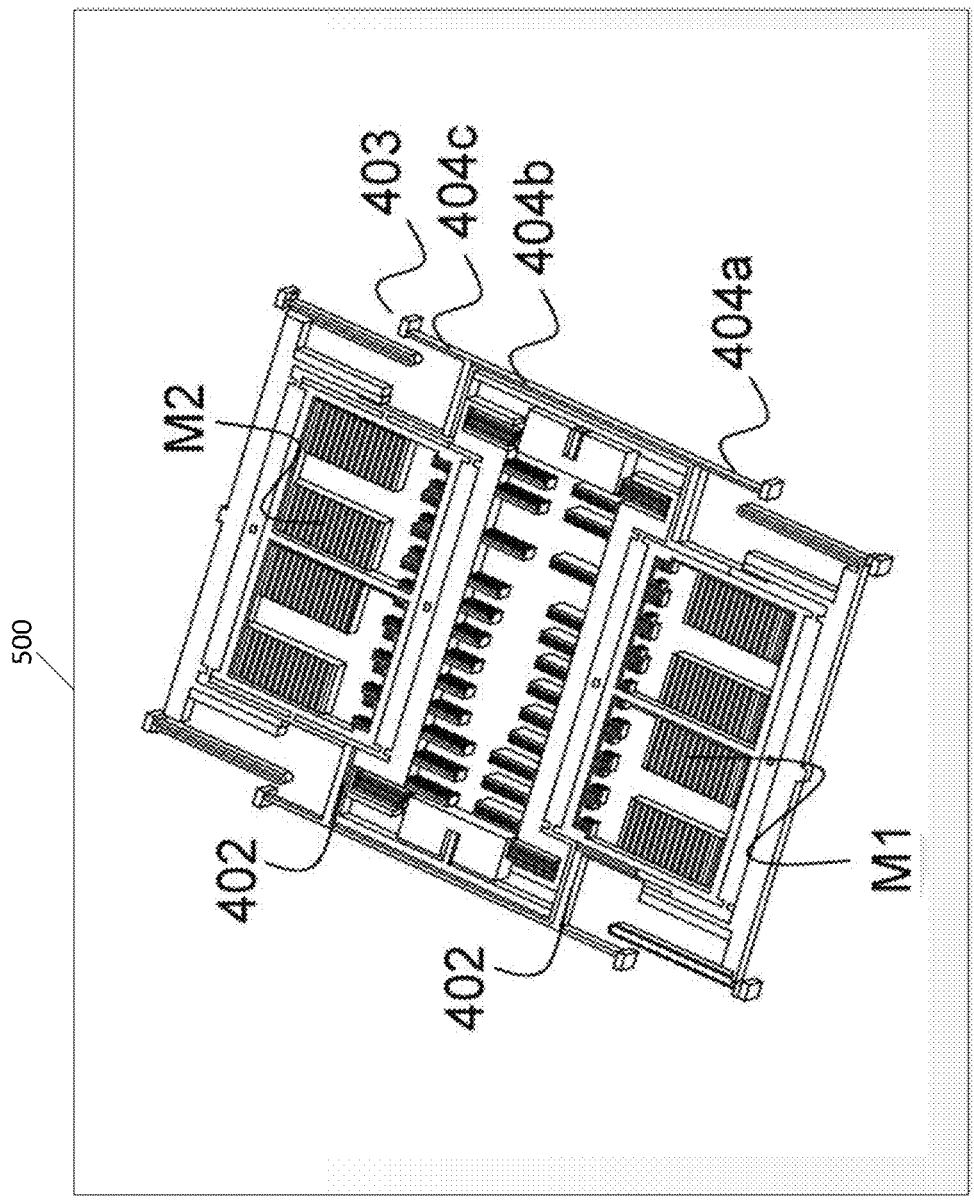

FIG. 10 illustrates a block diagram of a vehicle according to an embodiment.

Figure 11:
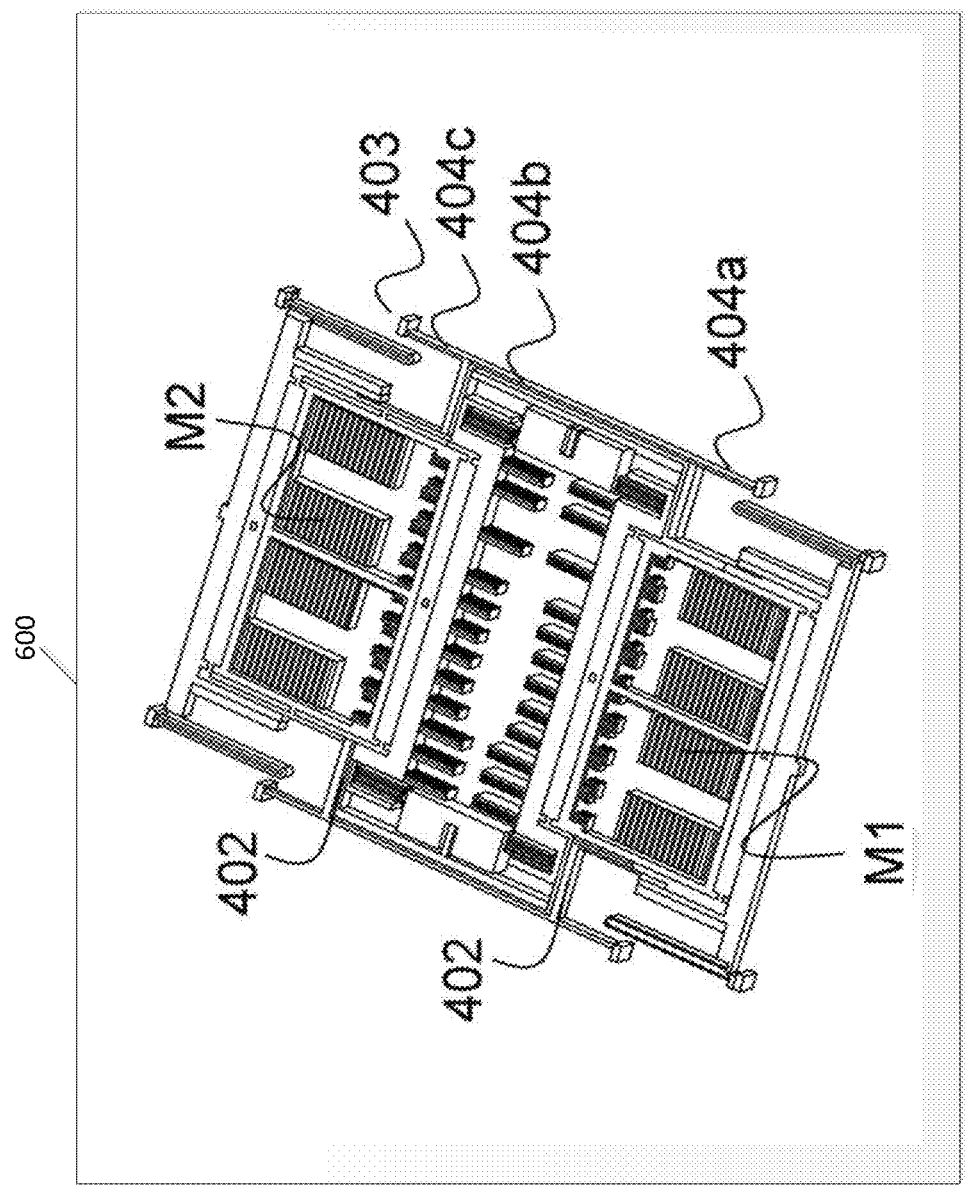

FIG. 11 illustrates a block diagram of a navigation device according to an embodiment.

A DESCRIPTION IN MORE DETAIL OF A SET OF EMBODIMENTS OF THE INVENTION

In FIG. 4, a spring structure according to an embodiment of the invention is illustrated as an example, the structure being arranged to couple the masses M1 and M2 vibrating on a common axis into opposite phase vibration. Thus, in the structure according to an embodiment of the invention, there is a spring structure 401, 402, 403, 404a, 404b, 404c coupling the two masses, which spring structure is composed of two stiff bars 402 and a bending spring 404a, 404b, 404c connecting the two bars 402. The bars are suspended 403 such, that they are allowed to turn about a support point located in one end. At the other end, the bars are connected 401 to the masses M1, M2 to be coupled. In FIG. 4, a simple example of the spring structure according to the embodiment of the invention is presented.

Figure 2:
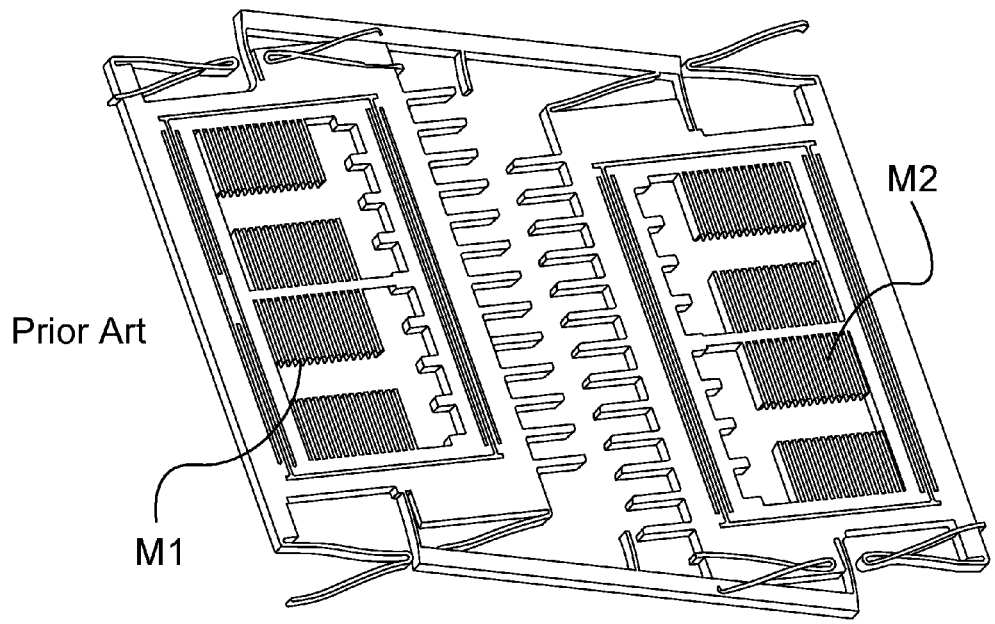
FIG. 2 illustrates, as such, such a Z axis sensor of angular velocity, which features a seesaw type coupled spring structure.
Figure 3:
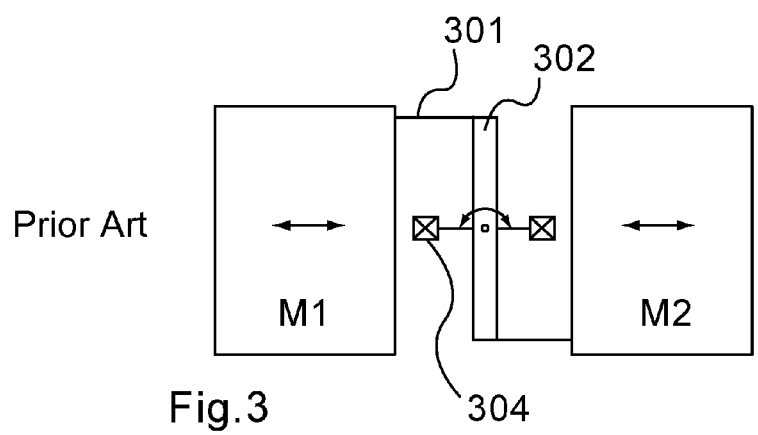
FIG. 3 illustrates a diagram of the space utilization of, as such, a seesaw type spring structure.

In FIG. 5 a spring structure according to an embodiment of the invention is illustrated as an example, the structure being arranged with a view to an angular velocity sensor structure similar to the one in FIG. 2, wherein a coupling in the Y direction of the detection axis for the masses M1 and M2 has been formed by means of the structure according to the embodiment of the invention. In the FIG. 5, in a Z axis angular velocity sensor structure, two springs 404a, 404b, 404c, positioned according to the embodiment of the invention are shown such, that they, at the ends, couple the masses into an opposite phase vibration mode on the detection axis.

Then, according to an embodiment of the invention, the coupling spring structures do not participate in the primary motion in any essential manner, since those said bars 402 are attached to the masses M1 and M2 with springs, which are loose in the x direction (in relation to the springs in the y direction), but stiff in the y direction (in relation to the springs in the x direction). In FIG. 6, the primary mode of the structure is being illustrated. The coupling spring structures at the masses' ends, according to an embodiment of the invention, do not appreciably, or almost not at all, participate in the primary mode. When the structure, vibrating in primary mode, is turned about the axis (Z) perpendicular to the surface plane, Coriolis forces, equal in strength but opposite in direction, act on the moving masses in the direction of the y axis. In FIG. 7, the detection mode of the Z axis angular velocity sensor structure is illustrated. The coupling spring structures 404a, 404b, 404c at the ends of the masses M1 and M2, according to an embodiment of the invention, couple the movements of the masses to each other and synchronize them into opposite phase.

As the masses get displaced toward each other, they turn the bars 402 towards each other, which bars bend the coupling spring 404a, 404b, 404c between them in a direction perpendicular to the direction of motion in accordance with FIG. 7. This is the weakest bending mode of the centrally located spring connecting the bars.

A blow or an external linear acceleration component in the direction of the detection axis causes a displacement in both masses in the same phase. As the masses are displaced in the same direction, the bars turn in the same direction, which forces the coupling spring into an S-shaped bending in accordance with FIG. 8. In this S-mode, the spring is considerably stiffer than in the case above. By suitable dimensioning, the coupling spring structure can be made even equally or over 4 times stiffer to displacement of the masses in the same direction than to opposite phase displacement. In an embodiment the spring can be designed to be even 10 times stiffer to in-phase deflection compared to anti-phase deflection.

According to an embodiment of the invention, a system of micromechanical resonators comprises at least one micromechanical resonator that comprises two masses (M1 M2) that are coupled in direction of their common motion axis with spring structure (401, 402, 403, 404a, 404b, 404c) that comprises at least two beams (402) connected to the masses and spring suspension (404a, 404b, 404c) parallel to the motion axis coupling the beams that deflects perpendicularly to the motion.

According to an embodiment of the invention, the structure according to that comprises means for connecting an electric voltage between a first part of the resonator and a second part in order to provide a capacitive structure between said parts, to be used for producing a capacitively readable signal, when the motion according to vibration of the spring structure changes the distance, and thus the capacitance, between said first and second parts. According to an embodiment of the invention, there is a multitude of said connecting means to be used in producing a multitude of signals.

According to one embodiment of the invention, at least one of the bars at the end is arranged with regard for piezoelectric effects for providing an excitation structure. According to one embodiment of the invention, one of said end bars is arranged to change its form in response to an electric signal being applied to it. According to one embodiment of the invention, one of said bars is arranged such, that the piezoelectric voltage corresponding to its bending can be measured at a certain part of the bar, to be used in the filtering of interference and/or other signal processing.

Advantages of the embodiments of the invention, compared to prior art as such, are extremely modest space usage requirement and linear attachment. Compared to the seesaw type suspension, the solution according to the embodiment of the invention takes about half as much space, whereby additionally an advantage of the structure according to the embodiment of the invention is the possibility of positioning it along the edge of the component, due to its long spring.

According to one embodiment of the invention, a navigator can be provided, which includes a function, in which the direction of motion at a certain point in time can be determined by means of the angular velocity determined by a certain sensor of the navigator and by means of a clock. According to one variant of the embodiment, there is no need to be restricted to exclusively planar examination in the location determination.

The attachment points to the masses of the suspension according to one embodiment of the invention are located on the same straight line extending in the direction of the motion axes. Due to that, the reaction forces of the spring do not induce a moment on the masses, like e.g. a seesaw spring. Furthermore, the suspension can be designed such, that it will not participate in any significant manner, if at all, in the masses' motions in the directions of other axes.

FIG. 10 illustrates one embodiment of a block diagram of a vehicle 500 which may contain a sensor including one or more micro-mechanical resonators as described above. The vehicle may be, for example, a toy, a piece of footwear, a bicycle, a moped, a motorcycle, a car, a train, a ship and/or an airplane.

FIG. 11 illustrates a block diagram of a navigation device 600 according to an embodiment. The navigation device may contain a sensor including one or more micro-mechanical resonators as described above.

I claim:

1. A micro-mechanical resonator, comprising:
   a first mass and a second mass coupled to move on a common axis of motion by a spring structure that comprises a first bar, a second bar and a spring, wherein
   the spring is suspended to extend parallel to the common axis of motion,
   a first end of the first bar is coupled to the first mass and a second end of the first bar is coupled to the spring such that the first bar is turned by displacement of the first mass in the direction of the common axis of motion,
   a first end of the second bar is coupled to the second mass and a second end of the second bar is coupled to the spring such that the second bar is turned by displacement of the second mass in the direction of the common axis of motion, and
   the second end of the first bar and the second end of the second bar are directly coupled to the spring such that the spring is bent between them perpendicularly to the direction of the common axis of motion in response to turning of the first bar by displacement of the first mass on the common axis of motion and of the second bar by displacement of the second mass on the common axis of motion.

2. The micro-mechanical resonator according to claim 1, wherein the spring is configured to bend into s-shape by a displacement of the masses in the same direction on the common axis of motion.

3. The micro-mechanical resonator according to claim 1, wherein the spring structure is configured to be stiffer to displacements of said masses in same phase than to displacements in opposite phase.

4. The micro-mechanical resonator according to claim 1, wherein at least one of said two masses has a comb-like structure.

5. The micro-mechanical resonator according to claim 4, wherein said comb-like structure is provided in order to achieve a certain surface area.

6. The micro-mechanical resonator according to claim 4, wherein said comb-like structure is provided in order to achieve a certain capacitance between a certain part of the comb-like structure and some part other than the comb-like structure.

7. The micro-mechanical resonator according to claim 1, wherein the micro-mechanical resonator is comprised in a micro-mechanical resonator matrix.

8. The micro-mechanical resonator according to claim 1, wherein the micro-mechanical resonator is comprised in a sensor.

9. The micro-mechanical resonator according to claim 8, wherein the sensor is comprised in a vehicle, said vehicle being at least one of the following: a toy, a piece of footwear, a bicycle, a moped, a motorcycle, a car, a train, a ship and an airplane.

10. The micro-mechanical resonator according to claim 8, wherein the sensor is comprised in a navigation device.

11. A system of micromechanical resonators, comprising:
   at least one micromechanical resonator that comprises a first mass and a second mass that are coupled to move on a common axis of motion with a spring structure that comprises a first bar, a second bar and a spring, wherein the spring is suspended to extends parallel to the common axis of motion,
   a first end of the first bar is coupled to the first mass and a second end of the first bar is coupled to the spring such that the first bar is turned by displacement of the first mass in the direction of the common axis of motion,
   a first end of the second bar is coupled to the second mass and a second end of the second bar is coupled to the spring such that the second bar is turned by displacement of the second mass in the direction of the common axis of motion, and
   the second end of the first bar and the second end of the second bar are directly coupled to the spring such that the spring is bent between them perpendicularly to the direction of the common axis of motion in response to turning of the first bar by displacement of the first mass on the common axis of motion and of the second bar by displacement of the second mass on the common axis of motion.

* * * * *